(12) United States Patent
Harris

(10) Patent No.: US 7,352,289 B1
(45) Date of Patent: Apr. 1, 2008

(54) SYSTEM AND METHOD FOR DETECTING THE CONNECTION STATE OF A NETWORK CABLE CONNECTOR

(75) Inventor: Jeremy Harris, Giles (GB)

(73) Assignee: Sun Microsystems, Inc., Santa Clara, CA (US)

( * ) Notice: Subject to any disclaimer, the term of this patent is extended or adjusted under 35 U.S.C. 154(b) by 454 days.

(21) Appl. No.: 10/662,017

(22) Filed: Sep. 11, 2003

(51) Int. Cl.
*H04Q 9/00* (2006.01)
(52) U.S. Cl. ............... 340/870.07; 340/310.11; 340/500; 324/66; 324/67; 324/500; 345/211
(58) Field of Classification Search ......... 340/870.07, 340/652, 656, 654, 682, 687, 310.11; 600/365; 128/903; 345/211; 324/500, 66
See application file for complete search history.

(56) References Cited

U.S. PATENT DOCUMENTS

| | | | | |
|---|---|---|---|---|
| 5,418,521 A | * | 5/1995 | Read | 340/568.3 |
| 5,644,462 A | * | 7/1997 | Boschetto et al. | 361/91.5 |
| 6,002,331 A | * | 12/1999 | Laor | 340/539.1 |
| 6,368,155 B1 | * | 4/2002 | Bassler et al. | 439/620 |
| 6,459,374 B1 | * | 10/2002 | Rand et al. | 340/568.2 |
| 6,842,114 B2 | * | 1/2005 | Billiard | 340/568.1 |
| 6,975,312 B2 | * | 12/2005 | Kim | 345/211 |

* cited by examiner

*Primary Examiner*—Jeffery Hofsass
*Assistant Examiner*—Sisay Yacob
(74) *Attorney, Agent, or Firm*—Martine Penilla & Gencarella, LLP (57) ABSTRACT

A method for detecting a network cable connection state is disclosed. The method includes detecting a change of connection state of a connector using a sensor that resides in the connector and generating cable connection state information from the information supplied by the sensor. Cable connection state information is communicated to a connection state monitoring utility for facilitating network fault detection. The cable plug or socket may also contain an embedded processor, memory and unique identification.

39 Claims, 6 Drawing Sheets

SYSTEM AND METHOD FOR DETECTING THE CONNECTION STATE OF A NETWORK CABLE CONNECTOR

BACKGROUND

The functionality of individual computer systems may be dramatically enhanced by coupling stand-alone types of devices together in order to form a network. Within a networking environment, users may readily exchange files, share information stored on a common database, pool network resources, and communicate via electronic mail (e-mail) and video teleconferencing. Moreover, computers which are coupled in a networking environment (such as LANs, WANs, and the Internet) can provide their users access to data and information from all over the world that is required to traverse cable networks before it reaches the user.

Cable networks may be employed to connect the devices that are connected to a network. In a network, there may be numerous individual cables, cable sockets and cable sub networks employed to connect the individual devices. Distinguishing between individual cables to determine which network devices are connected to a particular cable can be a daunting task. Discovering the physical cable topology is useful because many communication faults can be traced to a disconnected cable and socket.

In a networking environment, problems may arise that may affect the capacity of certain network connected devices to communicate with other network connected devices. In some cases, these problems may be related to the physical cabling component of the network infrastructure such as the cables and sockets that connect the network devices. In such cases identifying the particular cable or socket that is causing the problem may be difficult since there may be numerous potential problem sources that may require troubleshooting.

SUMMARY

Accordingly, a need exists for a method and system that allow the detection of a disconnection of a network cable plug or socket and its associated cable. The present invention provides a method and system that accomplishes this need.

For instance, one embodiment of the present invention provides a method for detecting a connection state of a network cable connector. The method includes detecting a disconnection of a connector using a sensor and processor that reside in a connection state detector of the connector and generating connector connection state information from the information supplied by the sensor. The connector connection state information generated is communicated to a connection state monitoring utility via the network to which the cable connector is coupled. Disconnection state can be detected by the absence of connection information for the cable.

An embodiment of the present invention also provides a cable connector. The cable connector includes a sensor that generates connection state information. Moreover the cable connector includes a processor for executing the transmission of the connection state information to indicate that a disconnection or failure of the cable connector has occurred. The connection state information is transmitted via the network to a connection monitoring utility which stores this information. The information may later be retrieved by users seeking to identify a disconnected cable. The same circuits can be applied to a socket.

An embodiment of the present invention provides a method for detecting a network cable disconnection. The method includes detecting a disconnection of a cable connector using a contact sensor that resides in a connection state detector of a cable connector and generating cable connector connection state information from the information supplied by the contact sensor. The cable connector connection state information generated by the sensor is communicated to a connection state monitoring utility using a network protocol. The connection state information is transmitted to a connection monitoring utility which stores and presents this information which may be used to trouble shoot a network communication fault.

In one embodiment, the cable connector may include a connection state detector. Components of the connection state detector may detect the disconnection of a formerly connected network connector (and associated cable) and may communicate a connection state of the cable connector (and associated cable) to a network connection status monitoring utility. According to one embodiment, a plurality of connection state detectors may be located at a plurality of network detection points and may be interrogated for connection state information on a periodic basis. According to one embodiment, a wireless cable connection state detector may be provided at network connector connection detection point to allow the wireless eliciting of connection state information by a network interrogation source.

In one embodiment, sensors residing at cable endpoints detect when the cable has become disconnected from a connector to which it was previously connected (e.g., plugged into). This information (e.g., cable connection state) may be retrieved by or transmitted to a connection monitoring utility (e.g., such as provided by a network administrator, server, etc.). A graphical user interface may be provided at the monitoring site to provide an image of the various physical connections that connect one device to another.

In one embodiment, sensors residing at cable endpoints detect the, fuse status, signal carrier status, power status or temperature of the connector. This information may be retrieved by or transmitted to a network monitoring utility (e.g. Such as provided by a network administrator, server, etc.).

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

SPECIFICATION

Reference will now be made in detail to embodiments of the invention, examples of which are illustrated in the accompanying drawings. While embodiments of the invention will be described, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of embodiments of the invention, numerous details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in logic blocks and other symbolic representations of operations on data bits within a computer system or electronic computing device. These descriptions and representations are the means used by those skilled in the data processing arts to most effectively convey the substance of their work to others skilled in the art. A logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of embodiments of the present invention, discussions utilizing terms such as "detecting" or "communicating" or the like, refer to the action and processes of an electronic computing device, that manipulates and transforms data.

Figure 1:
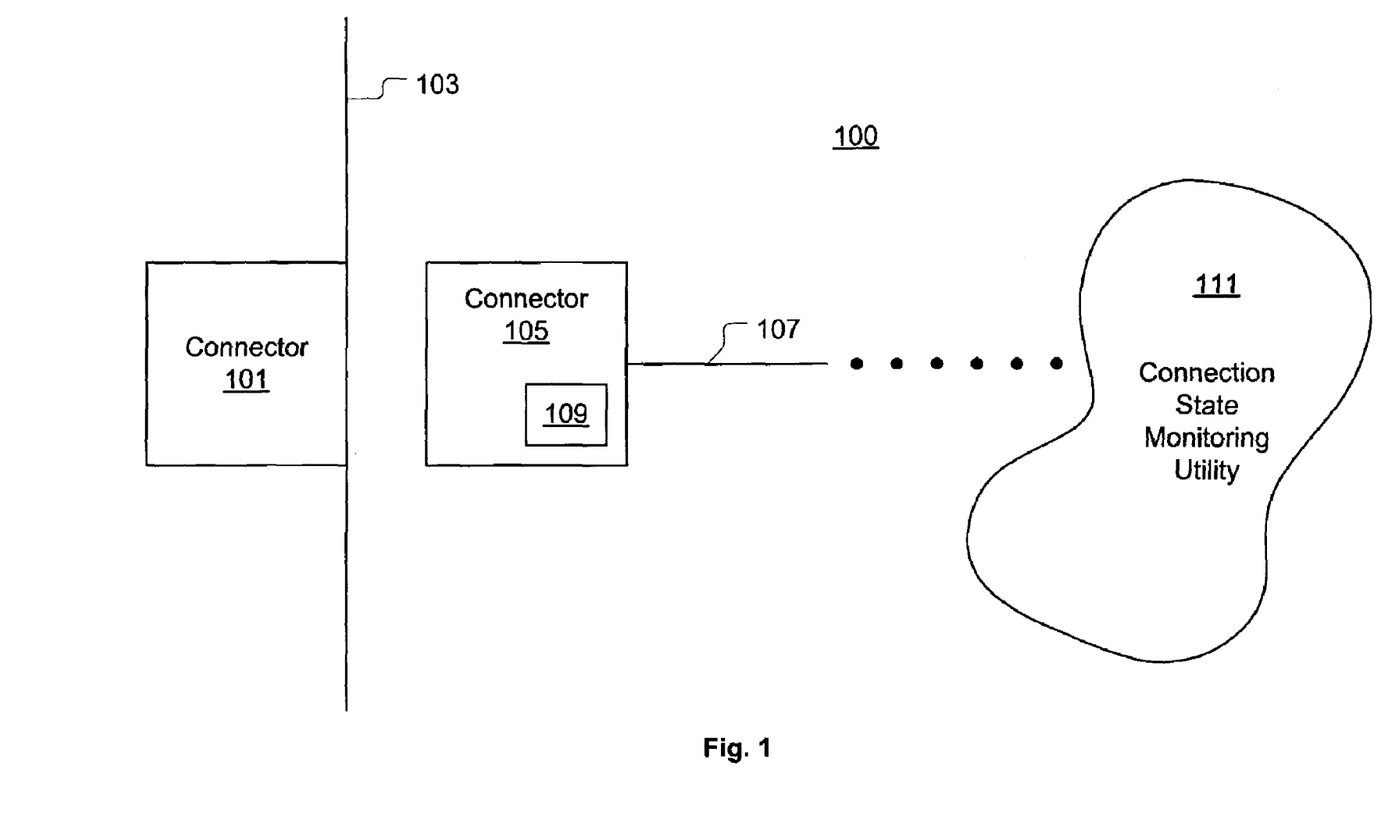
FIG. 1 shows a cable connector assembly according to one embodiment of the present invention.

FIG. 1 shows a cable connector assembly according to one embodiment of the present invention. According to some embodiments, sensors (see FIG. 2) residing at connectors (e.g., cable plugs etc.) located at cable endpoints detect a change in cable (e.g., 107) connection state (e.g., cable connector has become plugged or unplugged—has become disconnected from a socket to which it was previously connected or plugged into). This information (e.g., cable connection state information) may be accessed by or automatically transmitted to a connection state monitoring utility 111 (e.g., such as may be provided by a network administrator, server, etc.). The transmission may be executed via the network to which the cable is connected or by wireless medium. FIG. 1 shows first connector (e.g., wall socket) 101, wall 103 (only necessary in embodiments where wall socket connector is employed), second connector (e.g., cable plug) 105, cable 107, connection state detector 109 and connection state monitoring utility 111 (CMU). These structures encompass detection points located in an IT (information technology) network infrastructure that may be monitored to determine the connection state of the cable 107. Although the connection state detector 109 is shown located in the second connector 105 (e.g., cable plug), it could just as readily be located in the first connector 101 (e.g., socket) to detect the presence of the cable connector.

First connector (e.g., socket etc.) 101 receives the second connector 105 that is located at an endpoint of cable 107 when the cable 107 is connected via the second connector (e.g., plug) 105 into the first connector (e.g., wall socket etc.) 101. According to one embodiment the first connector (e.g., wall socket 101) may be mounted such as to a wall 103. It should be appreciated that when the second connector 107 is disconnected from the first connector (e.g., wall socket) for any reason, a connection state detector 109 that resides in the second connector (e.g., plug 105) may detect the disconnection and provide an indication of a cable connection state change that may be retrieved by or transmitted to a cable connection state monitoring utility 111. It should be appreciated that, according to one embodiment, a connection state detector (e.g., 109) may also reside in the first connector (e.g., wall socket) 101, as described above. As described to follow, connection state detector 109 may comprise a detector that detects a connectors connection state and a processor to communicate this state to the connection status monitoring utility 111.

Second connector 105 (e.g., cable plug) may be configured to engage (plug into) a first connector 101 (e.g. wall socket) and to support a cable connection state detector 109. According to one embodiment, when the second connector 105 is disconnected or connected to a first connector 101, an indication of a cable connection state may be retrieved by or transmitted to the connection state monitoring utility 111. As previously mentioned, according to one embodiment, a connection state detector may also reside in the first connector 101 that is associated with second connector 105. Alternatively, connection state information can be periodically transmitted from the second connector or first connector to the connection state monitoring utility 111 and the absence of fresh information would then indicate a disconnection at that point.

According to some embodiments, cable connectors (e.g., plugs) or wall connectors (e.g., wall sockets) may be employed and may have a unique ID (identification) that allows a cable connector or wall connector to be individually addressed. It should be appreciated that, according to one embodiment, the unique cable connector IDs may be mapped to specific wall connectors and devices to allow the identification of associated wall connectors and devices. The cable connector types employed may include but are not limited to RJ45 and other connector types. Cable connector and wall connector IDs may be communicated to the connection state monitoring utility 111 along with connection state information to not only indicate connection state but also to indicate cable connector/wall connector pairing.

Cable 107 may be coupled to second connector 105 and may supply network signals to network connected devices when the second connector 105 is plugged into first connector 101. The connection state of second connector 105 may be retrieved from a connection state detector 109 residing in second connector 105. If cable 107 and the second connector 105 become disconnected from the first connector 101 for any reason the connection state detector 109 that resides in the second connector 105 (e.g., cable plug etc.) may be interrogated by the connection state monitoring utility 111 for connection state information. According to one embodiment of the present invention, upon disconnection, the system can through such interrogation identify the location of the disconnection so that a remedy may be effected.

Almost any type of cable requiring physical contact with another cable or socket can be used, e.g., cable types employed may include twisted pair, Ethernet, or high grade cable. In alternate embodiments optical connectors may be employed and cable comprising optical fibers used to transmit the information.

Connection state detector 109 detects when a change in connection state occurs. As previously mentioned, according to some embodiments the connection state detector 109 may reside in second connector 105. According to some embodiments, the connection state detector 109 may also reside in first connector 101. It should be appreciated that the connection state detector 109 may include components that are employed to store and execute the instructions of an application that communicates the connection state of the connector in which it resides to connection state monitoring utility 111 (see FIG. 2 discussion). To this end, connection state detector 109 may contain a mechanical connection detector with electronic processor and communication interface circuit. It will be appreciated that many other types of connection detectors could be used, e.g., optical or capacitive.

Connection state monitoring utility 111 (CMU) monitors connection state detector(s) 109 for a signal that indicates that a connector disconnection has occurred or the lack of a periodic connection state. According to one embodiment, the connection state monitoring utility 111 may issue an interrogation signal that prompts the connection state detector 109 to transmit connection state information to the connection state monitoring utility 111.

As previously mentioned, connection state monitoring utility 111 may be a remote network administrator, server etc. However, according to alternate embodiments, the connection state monitoring utility 111 may be located at the local utility port of a server, user device, or network resource.

It should be appreciated that in addition to detecting the connection state of a cable connector, detection points located in an IT (information technology) network infrastructure may be monitored to determine other parameters. In one embodiment, sensors residing at cable endpoints may detect the, fuse status, signal carrier status, power status and/or temperature of the connector. This information may be retrieved by or transmitted to a network monitoring utility (e.g. Such as provided by a network administrator, server, etc.).

Figure 2:
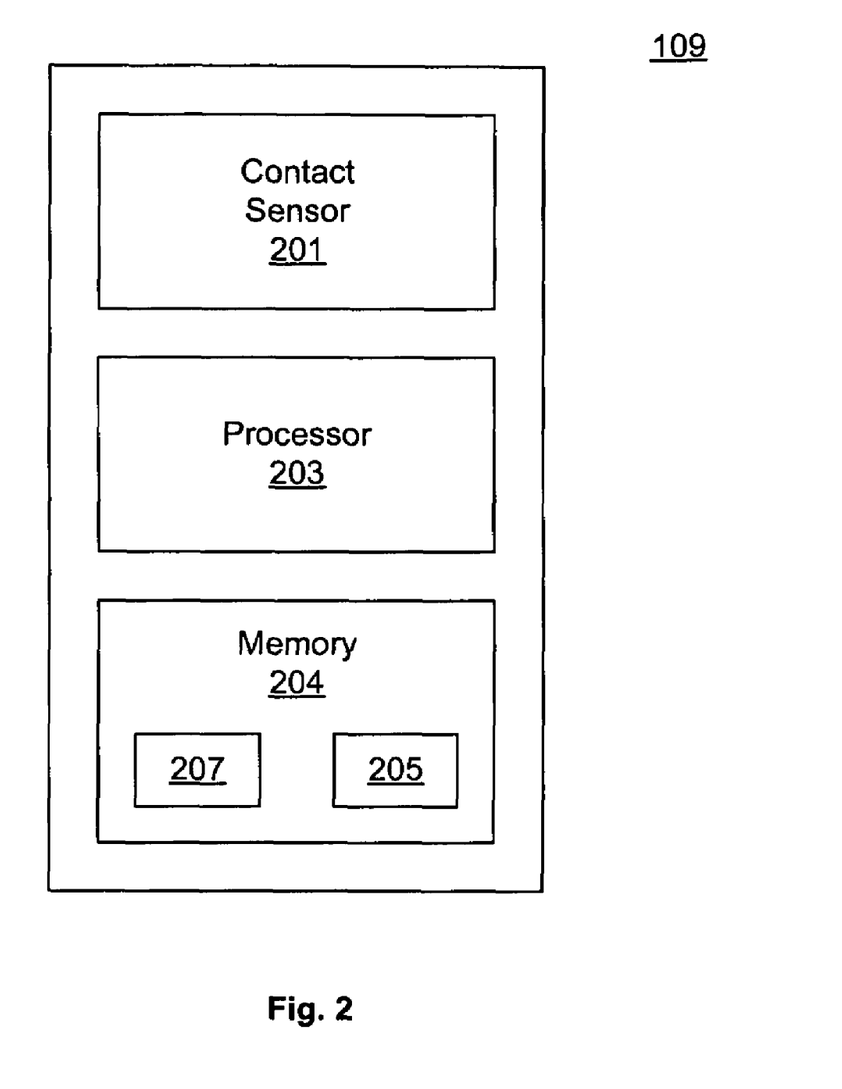
FIG. 2 is a block diagram of a connection status detection utility according to one embodiment of the present invention.

FIG. 2 is a block diagram of a connection state detector 109 according to one embodiment of the present invention. Components of the connection state detector (e.g., 109 of FIG. 1) may detect the disconnection of a formerly connected connector (e.g., 105 of FIG. 1) (and associated cable) and may communicate connection state information related to the connector (and associated cable) to a network connection state monitoring utility (e.g., 111 of FIG. 1). FIG. 2 shows contact sensor 201, processor 203, memory 204, and application 205 (e.g., network stack). Contact sensor 201 may include but is not limited to mechanical, electrical, optical, inductive or capacitive switch implementations. Connection state detector 109 can reside in either the first or the second connector.

Contact sensor 201 detects the connection state of an associated connector, e.g., if one formerly connected connector (e.g., 105) has been disconnected from another (e.g., 101) or vice versa. It should be appreciated that contact sensor 201 converts physical information regarding the connection state of connectors into a readable form such as analog or digital voltage, current, charge, or frequency.

According to one embodiment, upon a change in the connection state of an associated connector the contact sensor 201 may provide an indication of the connector's connection state change. As mentioned above, contact sensor 201 may comprise but is not limited to mechanical, optical, electrical, inductive, and capacitive switch implementations, for instance.

Memory 204 and processor 203 components are employed to respectively store and execute the instructions of an application 205 that can communicate the connection state of the connector to a connection monitoring utility. According to one embodiment the processor may include a low power single chip processor with built in networking hardware. Moreover, the memory space may be allocated so that the unique address 207 may be accommodated. Application 205 (e.g., network stack) may also contain network communication protocol information.

Application 205 (e.g., network stack) communicates information retrieved from the contact sensor 201 related to cable connection state to an interrogation source (e.g., connection state monitoring utility). As previously mentioned, the contact sensor 201 converts physical information regarding the connection state of connectors into a readable form that may be interpreted and translated into connection state information and transmitted to the connection state monitoring utility 111.

According to one embodiment, the application may include a network stack that that can communicate with a connection monitoring utility (e.g., 111) using a network protocol. According to one embodiment the networking stack may use a protocol selected from a protocol group that includes but is not limited to IPv6 (Internet Protocol Version 6), Ethernet, TCP (Transmission Control Protocol), finger, and SNMP (Simple Network Management Protocol), token ring or any well known network communication protocol.

Figure 3:
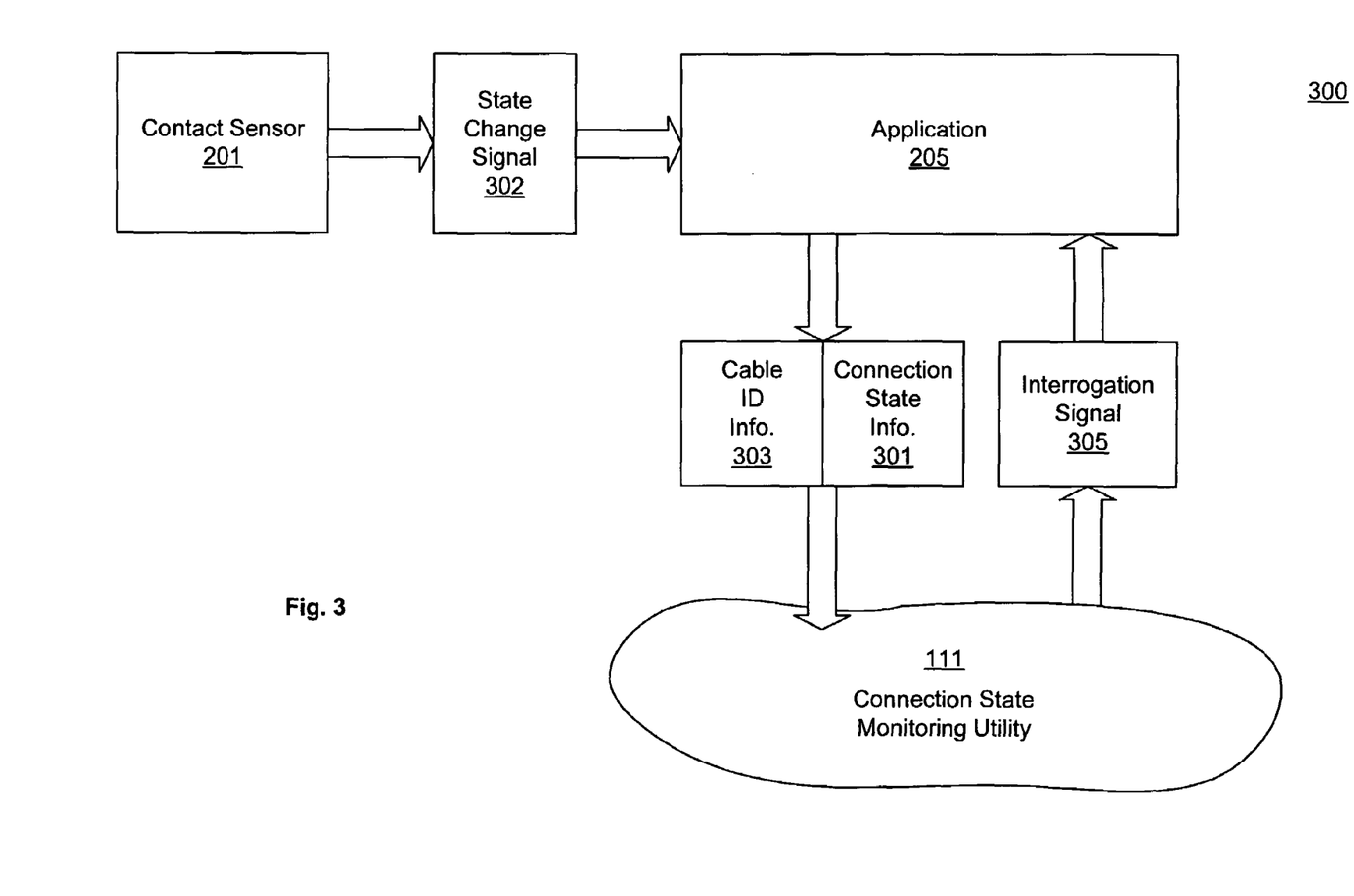
FIG. 3 is a functional block diagram illustrating the operation of the system according to one embodiment of the present invention.

FIG. 3 is a functional block diagram 300 illustrating the operation of a connector state change detection system according to one embodiment of the present invention. FIG. 3 illustrates the relationship between system components and associated data structures. FIG. 3 shows contact sensor 201, connection state information 301, state change signal 302, application 205, cable identification information 303, interrogation signal 305, and connection state monitoring utility 111.

Connector connection state information 301, related to a specific cable connector or connector (e.g., 105), may be communicated to the connection state monitoring utility 111 from the cable connector as is illustrated in FIG. 3, either periodically or after and in response to an interrogation signal 305 transmitted from an interrogation source (e.g., connection monitoring utility) is received by a connector (e.g., 101, 105). Upon the detection of a change in the connection state of a connector, a state change signal 302 may be generated by a contact sensor 201 that resides in either a first connector or a second connector (and that is a part of the connection state detector 109). The state change signal 302 prompts a transmission (that is controlled by processes of application 205) of connection state information 301 and cable identification information 303 (e.g., corresponding to a unique cable plug or socket ID) to connection state monitoring utility 111.

According to one embodiment of the present invention, this information may be communicated upon the receipt of an interrogation signal from the connection state monitoring utility 111. In another embodiment, connection state information 301 and cable identification information 303 may be transmitted to the connection state monitoring utility 111 automatically upon the detection of a disconnected cable connector or, the connection state information 301 may be periodically communicated to the connection state monitoring utility 111 with the absence of connection state information indicating a disconnection. According to one embodiment, the time that a connector was connected and the time that a disconnection occurred may be recorded by the connection state detector 109 and transmitted to the connection state monitoring utility 111. In one embodiment the power required to allow the first or second connectors detection and communication elements to function may be obtained from the network to which they are coupled. In another embodiment a separate power supply may be utilized.

Figure 4:
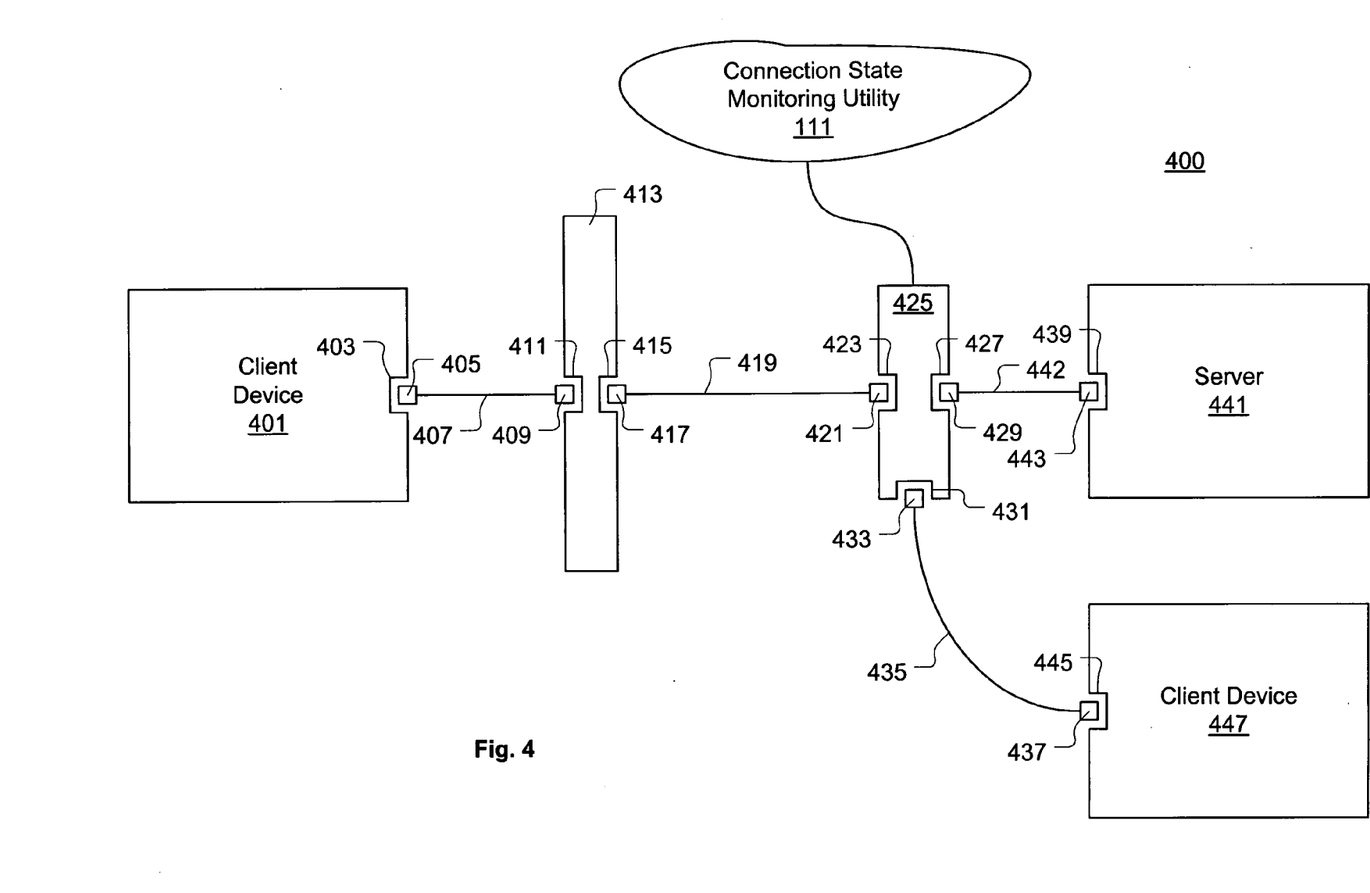
FIG. 4 is a diagram that illustrates network cable plug connection detection points according to one embodiment of the present invention.

FIG. 4 is a diagram that illustrates network connection state detection points according to various embodiments of the present invention. In the particular embodiment shown in FIG. 4, connection state detection points are illustrated in the context of a system of cable socket and plug connectors. According to one embodiment, a connection state detector located at detection points (e.g., cable socket, plug or both) may be interrogated for connection state information. FIG. 4 shows client device 401, socket 403, cable1 plug 405, cable 1 407, cable1 plug2 409, wall socket1 411, wall 413, wall socket2 415, cable2 plug 417, cable 2 419, cable 2 plug2 421, switch socket1 423, switch 425, switch socket2 427, cable3 plug1 429, switch socket3 431, cable4 plug1 433, cable3 435, cable3 plug2 437, server socket 439, server 441, cable4 442, cable4 plug2 443, client device2 socket 445, and client device 447.

Each of the cable plugs and sockets enumerated above and shown in FIG. 4 are merely presented to illustrate potential connection state detection points in a typical network. It should be appreciated that each of the cable plugs and sockets that are enumerated constitute potential network cable plug connection state detection points where connection state detectors may be embedded that may be interrogated for cable plug connection state information.

According to one embodiment, upon the change in detection state of a cable plug from a network socket located at any point in the network shown in FIG. 4, connection state information that indicates that a disconnection (or failure of the cable or cable plug or socket) of a cable plug has occurred may be communicated from the cable plug or the associated network socket by a connection state detector embedded in either the cable plug, the socket or both. The communication of this information may be effected upon the receipt of a network interrogation signal communicated from the connection state monitoring utility 111.

For example, if cable3 plug2 437 is disconnected (e.g., due to a physical disconnection or plug failure etc.) from the socket to which it was formerly connected (e.g., client device2 socket 445), the connection state detector in the cable plug (e.g., 437) or in the socket (e.g., 445) to which the cable plug was formerly connected may communicate information related to the cable plug disconnection to the connection status monitoring utility 111. According to one embodiment, a user of a network connected device (e.g., 401, 441, 447) may upon experiencing a networking problem (e.g., accessing a disconnected device) caused by a disconnected cable (e.g., 407, 419, 442 and 447), access the information collected by the connection monitoring utility 111 in an attempt to identify the location of the cable that has been disconnected. According to one embodiment, access to the information collected by the connection state monitoring utility 111 may be made by means of a user interface presented to a client device user.

It should be appreciated that, according to one embodiment, the information collected by the connection state monitoring utility may be accessed by network clients and presented (e.g., such as in a user interface) to them in a manner that indicates the specific location of the disconnection. According to one embodiment, in the example discussed above where cable3 435 has been disconnected from its associated socket (e.g., 445), an indication may be made to the user that a disconnection of cable3 435 has occurred with this information being graphically provided to the user by means of a graphical user interface (not shown).

According to one embodiment, the monitor may include a display indicating the physical connections or links required to couple device 401 to device 441, or device 441 to device 447. These may be in the form of color images illustrating the connections in a topology form or other schematic or pictorial depiction. Upon network fault, the images may indicate a disconnection state which could help to identify or isolate the location of the fault.

Figure 5:
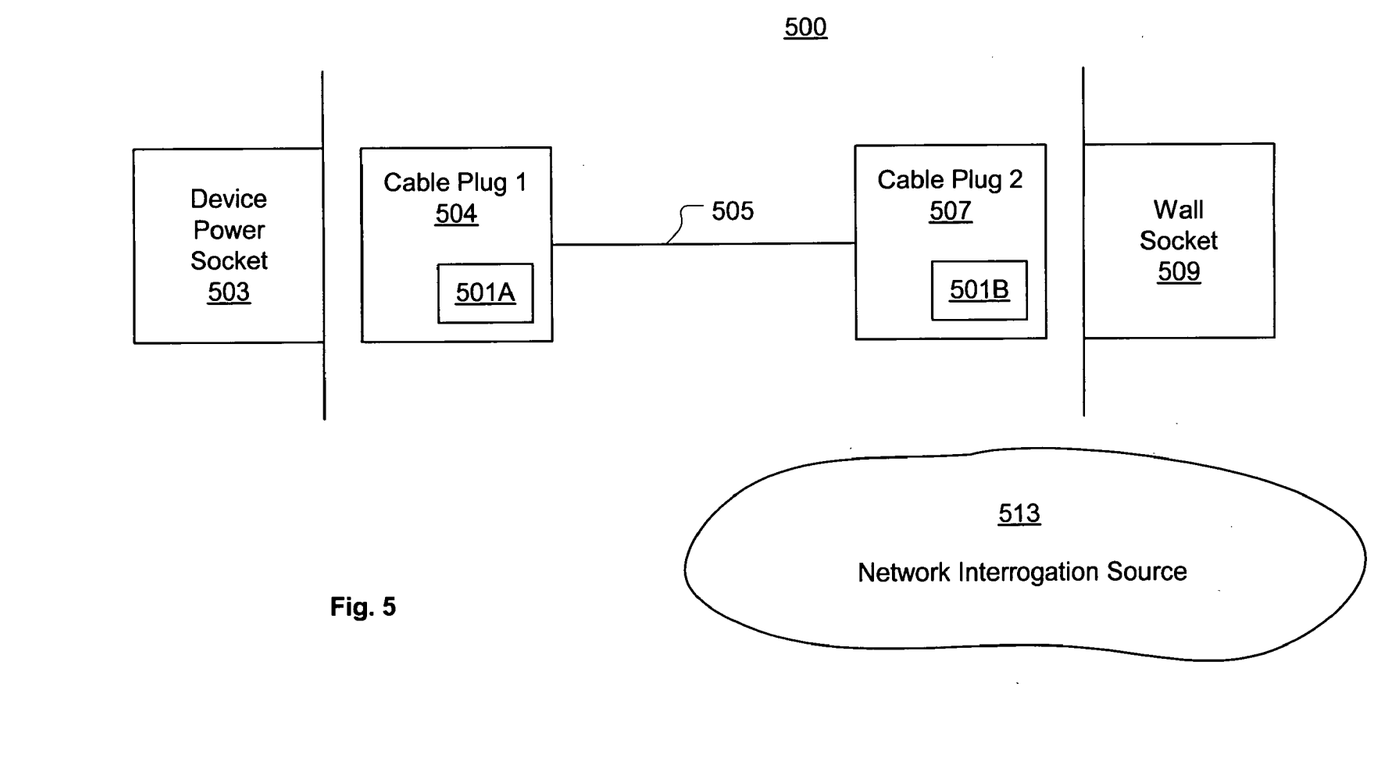
FIG. 5 is a diagram of a wireless implementation of the system according to one embodiment of the present invention that may be used in a power cable or network cable

FIG. 5 is a diagram 500 of a wireless implementation of cable plug connection state detection system according to one embodiment of the present invention that can be used for power or network cable connections. According to one embodiment, a wireless cable plug connection state detector may be provided at a network plug or socket connection detection point(s) that allow the wireless eliciting of connection state information by a remote network interrogation source. FIG. 5 shows connection state detectors 501A and 501B, device power socket 503, cable plug1 504, cable 505, cable plug2 507, wall socket 509, and network interrogation source 513.

According to one embodiment, device power socket 503, cable plug1 504, cable plug2 507, and wall socket 509 represent potential connection state detection points where a cable plug connection state detector may be mounted. It should be appreciated that the mounted connection state detectors (e.g., 501A and 501B) can be interrogated for connection state information related to the cable plugs (e.g., 504 and 507) that are located at the endpoints of the associated cable 505. As is discussed herein, the connection state detectors may be interrogated by a network interrogation source 513 for cable plug connection state information related to an associated cable and cable plugs (e.g., 504 and 507). It should be appreciated that according to one embodiment, the increased level of power that may be involved in wireless transmissions may be easily accommodated from the available power source.

EXEMPLARY OPERATIONS IN ACCORDANCE WITH EMBODIMENTS OF THE PRESENT INVENTION

Figure 6:
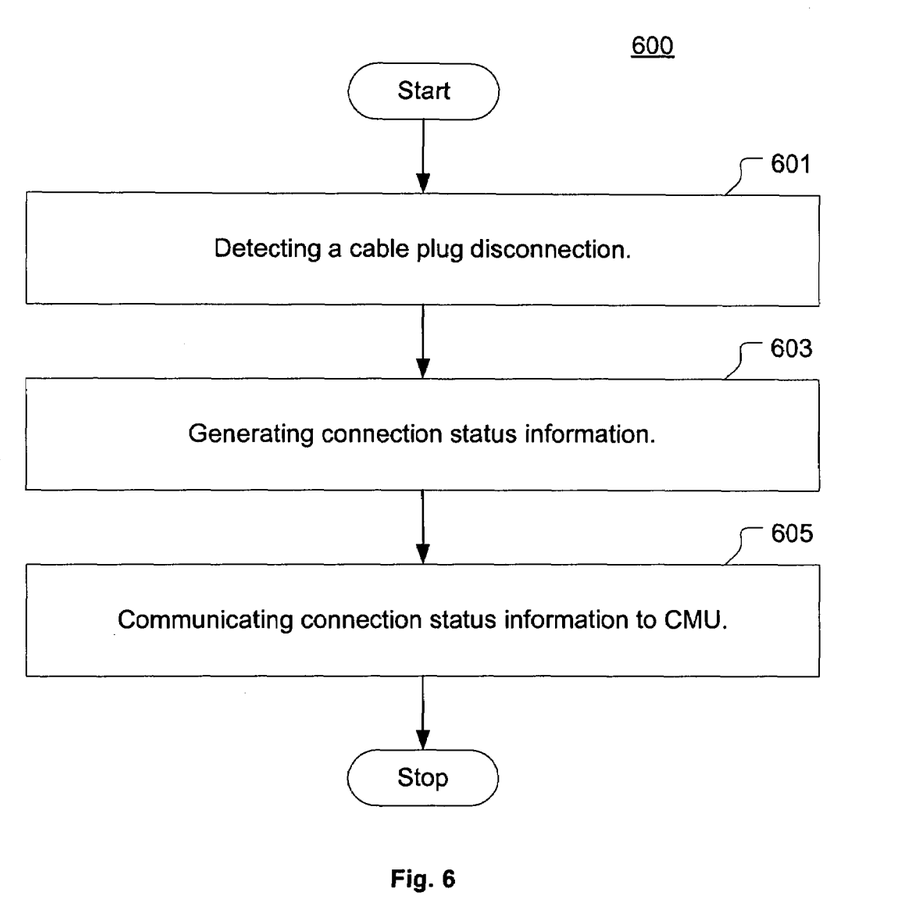
FIG. 6 is a flowchart of the steps performed in a computer controlled process for detecting a cable connection status according to one embodiment of the present invention.

FIG. 6 shows a flowchart 600, of the steps executed in processes of the present invention which, in one embodiment, are carried out by processors and electrical components under the control of computer readable and computer executable instructions. The computer readable and computer executable instructions reside, for example, in data storage. However, the computer readable and computer executable instructions may reside in any type of computer readable medium. Although specific steps are disclosed in the flowcharts, such steps are exemplary. That is, the present invention is well suited to performing various other steps or variations of the steps recited in the flowcharts. Within the various embodiment, it should be appreciated that the steps of the flowcharts may be performed by software, by hardware or by a combination of both.

FIG. 6 is a flowchart of the steps performed in a process for detecting a cable connection state according to one embodiment of the present invention.

At step 601, a sensor located in a connection state detector of a cable plug or socket detects the connection state of its associated cable plug or socket. According to one embodiment the sensor may be a contact sensor. According to other embodiments, the contact sensor may be of a type selected from a group that includes but is not limited to mechanical, electrical, inductive, resistive capacitive and optical, etc., or any other suitable mechanism for detecting physical and/or electrical connection to a cable and/or socket.

At step 603, connection state information is generated from the sensor operations of step 601. This information indicates whether the cable plug has been disconnected (or a failure of some sort has occurred) from the associated wall socket or vice versa.

At step 605, connection state information is communicated to the connection state monitoring utility 111 periodically. According to this embodiment, a detected cable plug connection state change (e.g., a formerly connected cable plug becomes disconnected or some other sort of failure occurs) is communicated to the connection state monitoring utility (e.g., CMU 111). The monitor may then present a graphical display or other depiction of the connection state of various plugs and sockets in the network.

According to an alternate embodiment, this information may be communicated after the cable plug or socket has been interrogated. According to this embodiment, the interrogation signal prompts the connection state detector of a connector to transmit connection state information to the connection state monitoring utility.

As noted above with reference to exemplary embodiments thereof a method and system for detecting a network cable change in state are disclosed. The method includes detecting a disconnection of a connector using a sensor that resides in the connector and generating cable connection state information from the information supplied by the sensor. The cable connection state information is communicated to a connection state monitoring utility by way of the communication network that is coupled to the connector, for instance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for detecting an information technology (IT) network cable disconnection, said method comprising:
   detecting a change of connection state of a network cable connector using a sensor that resides in said network cable connector, wherein the network cable connector is defined to enable connection of an IT network cable to an IT network connected device such that IT network signals can be transmitted between the IT network connected device and the IT network cable through the network cable connector;
   transmitting a change of connection state signal from the sensor to a processor within the network cable connector;
   operating the processor within the network cable connector to generate connection state information from the change of connection state signal; and
   operating the processor within the network cable connector to communicate said connection state information to a connection state monitoring utility within the IT network.

2. The method as described in claim 1, wherein said network cable connector is a cable plug.

3. The method as described in claim 1, wherein said network cable connector is a socket.

4. The method of claim 1, wherein said sensor includes a switch selected from the group that includes mechanical, electrical, resistive, optical and capacitive switches.

5. The method of claim 1, wherein said network cable connector further comprises a memory.

6. The method of claim 5, further comprising:
   operating the processor within the network cable connector to use a communication protocol selected from the group that includes IPv6 (Internet Protocol Version 6), TCP (Transmission Control Protocol), finger, and SNMP (Simple Network Management Protocol).

7. The method of claim 2, wherein said cable plug is attached to an endpoint of said network cable.

8. The method of claim 5, wherein said network cable connector receives a communication from the connection state monitoring utility within the IT network that interrogates said sensor regarding the connection state of said network cable connector.

9. The method of claim 1, wherein said connection state information is transmitted wirelessly to said connection state monitoring utility.

10. The method of claim 1, wherein a unique identification is mapped to said network cable connector.

11. The method of claim 10, further comprising communicating said unique identification with said connection state information.

12. The method of claim 1, further comprising detecting, generating and communicating information related to power status, fuse status, carrier signal status and temperature.

13. The method of claim 1, wherein electrical power for detecting said network cable disconnection is obtained from the network.

14. A method for detecting an information technology (IT) network cable connection state, said method comprising:
   detecting a state change of a network cable connector within an IT network using a contact sensor that resides in said network cable connector;
   transmitting a change of connection state signal from the sensor to a processor within the network cable connector;

operating the processor within the network cable connector to generate connection state information from the change of connection state signal;

receiving an interrogation signal at the processor within the network cable connector from a connection state monitoring utility within the IT network; and operating the processor within the network cable connector to communicate said connection state information from the network cable connector through the IT network to said connection monitoring utility using a network communication protocol in response to receiving the interrogation signal.

15. The method of claim 14, wherein said contact sensor includes a switch selected from the group that includes mechanical, electrical, resistive, optical and capacitive.

16. The method of claim 14, wherein said network cable connector includes a memory.

17. The method of claim 14, further comprising:
operating the processor within the network cable connector to use a communication protocol selected from the group that includes IPv6, TCP, finger, and SNMP.

18. The method of claim 17, wherein a cable plug is attached to an endpoint of said network cable.

19. The method of claim 14, wherein said connection state information is transmitted wirelessly.

20. The method of claim 16, wherein a unique identification is mapped to said memory of said network cable connector.

21. The method of claim 14, further comprising reading the time that said network cable connector disconnected.

22. The method of claim 14, further comprising detecting, generating and communicating information related to power status, fuse status, carrier signal status and temperature.

23. The method of claim 14, wherein electrical power for detecting said network cable connection state is obtained from the network.

24. A information technology (IT) network cable connector, comprising:
a sensor disposed within the IT network cable connector, the sensor defined to sense a connection state of the IT network cable connector and to generate a connection state change signal; and a processor disposed within the IT network cable connector, the processor coupled to said sensor, the processor defined to respond to generation of the connection state change signal by transmitting connection state information over a communication network to indicate a connection state of said IT network cable connector, wherein the IT network cable connector is defined to enable connection of an IT network cable to an IT network connected device such that IT network signals can be transmitted between the IT network connected device and the IT network cable through the IT network cable connector.

25. The connector of claim 24, wherein said network cable connector further comprises a memory coupled to said processor.

26. The connector of claim 24, wherein said communication network communicates using a protocol selected from the group that includes IPv6, TCP, finger and SNMP.

27. The connector of claim 24, wherein said sensor is a contact sensor.

28. The connector of claim 24, wherein said processor operates in response to an interrogation signal to ascertain connection state information.

29. The connector of claim 24, wherein said processor operates in response to said connection state change signal.

30. The connector of claim 24, wherein said connection state information is transmitted wirelessly.

31. The connector of claim 24, wherein said sensor is selected from the group that includes mechanical, electrical, resistive, optical, and capacitive.

32. The connector of claim 24, wherein said network cable connector comprises an RJ45 twisted pair connector.

33. The connector of claim 25, wherein a unique connector identification is mapped to said memory.

34. The connector of claim 25, wherein said memory records the time that a network cable connector change in state occurs.

35. The connector as described in claim 24, wherein said network cable connector is a plug.

36. The connector as described in claim 24, wherein said network cable connector is a cable socket.

37. The connector as described in claim 24, wherein said network cable connector is a power connector.

38. The connector of claim 26, wherein said network cable connector detects, generates and communicates information related to power status, fuse status, carrier signal status and temperature.

39. The connector of claim 26, wherein electrical power for detecting said network cable connection state is obtained from the network.

* * * * *